United States Patent [19]

Opelt

[11] 4,179,712
[45] Dec. 18, 1979

[54] SYSTEM FOR ELECTRONIC EDITING OF TAPE

[75] Inventor: Christian Opelt, Bernbach, Fed. Rep. of Germany

[73] Assignee: GRUNDIG E.M.V. Elektro-Mechanische Versuchsanstalt Max Grundig, Fuerth, Fed. Rep. of Germany

[21] Appl. No.: 907,160

[22] Filed: May 18, 1978

[30] Foreign Application Priority Data

Jun. 21, 1977 [DE] Fed. Rep. of Germany ....... 2727760

[51] Int. Cl.² ........................ H04N 5/78; G11B 27/08
[52] U.S. Cl. .......................................... 360/14; 360/13
[58] Field of Search .................................... 360/14, 13

[56] References Cited

U.S. PATENT DOCUMENTS

| 3,681,523 | 8/1972 | Sidline ..................................... 360/14 |
| 3,911,488 | 10/1975 | Wood et al. ............................ 360/14 |
| 3,978,521 | 8/1976 | Langer et al. .......................... 360/73 |
| 4,115,819 | 9/1978 | Shigeta ................................... 360/14 |

Primary Examiner—Stuart N. Hecker

[57] ABSTRACT

A system for electronic editing of tape with magnetic tape recording and play-back machines for video signals.

7 Claims, 1 Drawing Figure

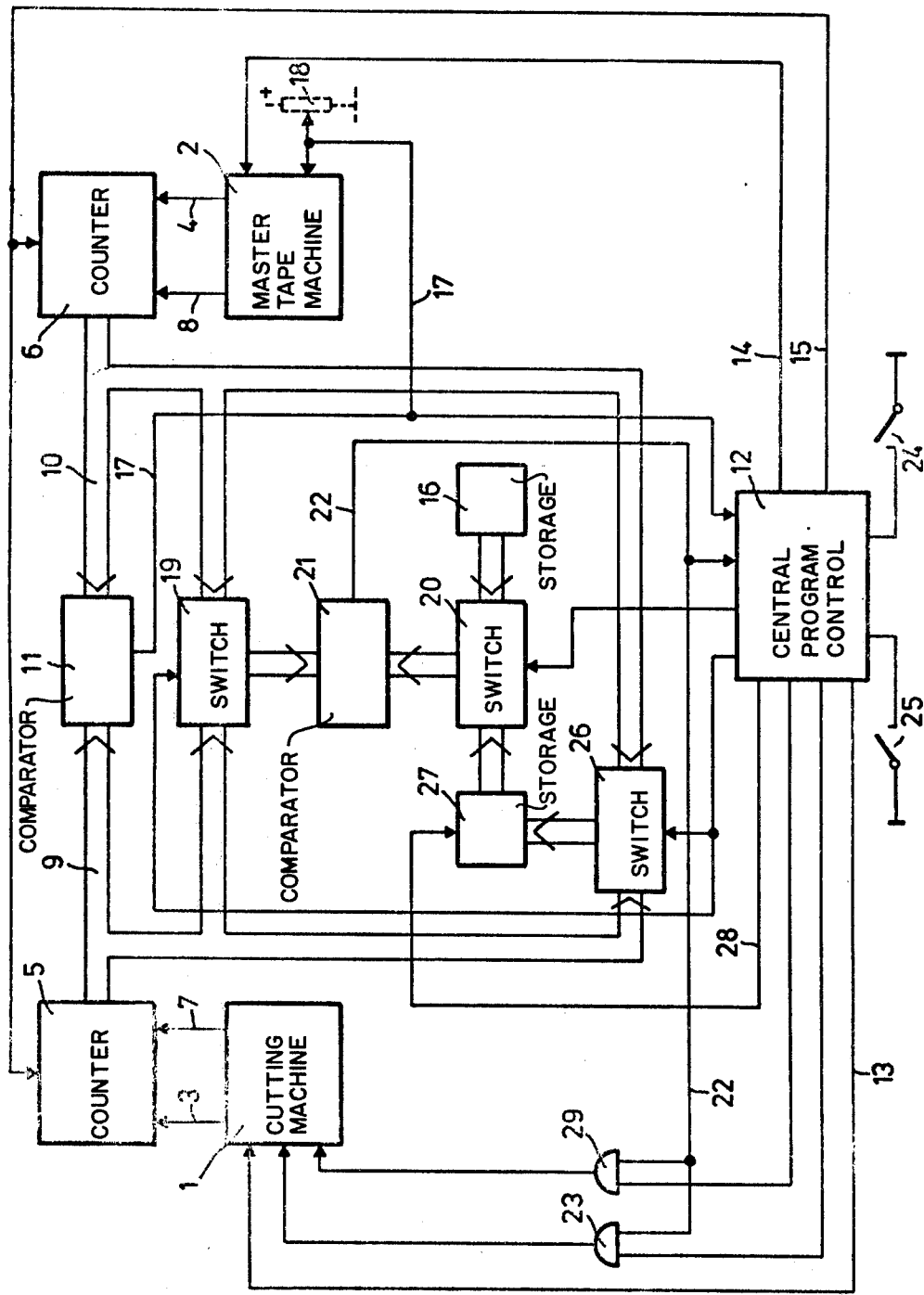

SYSTEM FOR ELECTRONIC EDITING OF TAPE

BACKGROUND OF THE INVENTION

In making playable magnetic tapes it is common practice in the studio to record the individual scenes totally or partially in random series on tape and later to record the same onto a second tape in the correct sequence with eventual cuts or other changes. For this purpose two tape machines are required, whereby a plurality of search runs, intersection point determinations and the like have to be carried out. To automate such mixing operations it is known to provide a code track in running direction of the tape which contains continuous information about the length of the tape, the playing time of the tape etc. With the aid of this code track a master tape on a feeding machine is brought into the correct time and space relationship with the slave tape on a cutting machine by means of corresponding electronic circuits. This method is very exact but is very expensive, because in addition to the control, a code generator and two decoding means are required, and both machines must be fitted for recording and playback of the code track.

A more simplified method is known consisting essentially of the two video machines which are manually moved to the intersection position at which point they remain idle. When the cutting signal is given both machines move in a reverse direction a predetermined tape length and then are automatically switched to the normal playing operation. After the predetermined tape length is run the cutting machine switches to recording. The disadvantage of this method is the inexactness of the timely positioning of the master tape and the second tape (slave tape), because the uptake and slowing speeds when reversing the tape are not controllable and change from machine to machine according to its parameters and in the same machine during operation.

SUMMARY OF THE INVENTION

The subject invention provides an arrangement which simplifies the cutting procedure in the absence of a code track wherein all inaccuracies are removed and no other requirements are made concerning the machines. This is achieved since in a arbitrarily predetermined cutting start the counted tacho-pulses of the tape feeding shafts in both running directions is the actual value for the given tape positions in both machines.

The subject invention is based on the realization that commercially available video machines are already provided with components which may be used for the purpose of this invention without additional expenses. The tape transport motor of each recording machine is controlled by a servo control for maintaining the tape speed in the video machines. The actual number of revolutions is constantly compared with the nominal number of revolutions. Thereby, the actual number of revolutions is given by the frequency and if need be by the phase of the pulse of a tacho-pulse generator, while the vertical pulses of the video signal or the synchronizing track act as the reference point for the nominal condition. When the two machines are reversed from the chosen cutting position while counting the tacho-pulses, the count differential reflects instantly the difference between the two tape lengths of both machines. This difference can be adjusted via the count results during the subsequent forward movement of the machines and the tapes.

The advantage of such an arrangement is apparent in the very accurate cutting operation and in complete independency from the machine parameters. Since the information for the tape position is not taken up by a code or synchronizing track, the device may be operated with very low tape speeds to a point where the tape is almost at a rest position.

In accordance with a particular embodiment of the invention it is possible to pre-program and predetermine the insert end, after the start position of the insert has been determined, where-at the insert end may be determined in a slow motion run, even from picture to picture. Furthermore, it is also possible to carry out the mutual follow up control of the machines by means of the search control, that is, without disturbing the very sensitive servo control of the tape feeding motor. These control circuits are usually very steep and have to be steep for the time of recording and can therefore not be spread over a larger frequency range for the time of the follow up control without auxiliary circuit means. However in the inventive arrangement whereby the follow up control is accomplished by the search control, all complications are removed.

BRIEF DESCRIPTION OF THE DRAWINGS

The FIGURE is a schematic showing of a system constructed in accordance with the teachings of the invention.

DESCRIPTION OF A PREFERRED EMBODIMENT

The FIGURE shows cutting machine M1 having the reference numeral 1 on which the tape is to be cut. The master tape with randomly recorded scenes is on machine M2 indicated also by reference numeral 2. The tacho pulses of M1 and M2 are fed to counter 5 and 6 respectively through lines 3 and 4. These counters are forward and reverse counters. The counters receive information through lines 7 and 8 to inform the counters whether they should count forward or backward during the movement of the tape.

The outputs of the counters are delivered in a binary coded form through lines 9 and 10 and are compared with each other in comparator 11.

Machines M1 and M2 are remotely controlled from a central program control 12 through lines 13 and 14 whereby they are moved to the desired cutting position. The cutting position itself is fed into counters 5 and 6 by setting the counters to a predetermined value through line 15. The same value is transmitted continuously in binary coded form from value transmitter 16. When the signal to start the cutting procedure is given by switch 25, both machines M1 and M2 move in reverse direction for about 5 to 6 seconds and become stationary, while the central program control 12 initiates the starting signal for machine M1 for play-back after a period of further 1 to 2 seconds, whereby the tape feeding motor locks to its normal control circuit. In contrast thereto the tape feeding motor of M2 does not lock into its associated control circuit, but is firstly subjected to a follow-up control due to the error signal which is present in line 17 and corresponds to the difference between the count of counters 5 and 6.

When conformity is achieved between the counts of counters 5 and 6, that is, when the error signal disappears in line 17, the tape feeding motor of M2 locks into its associated control circuit.

The servo controls for the tape feeding motors must have a very steep control characteristic and are suitable for use in the described follow-up control only if the total characteristics of the servo control are changed by further switchings simultaneously with the locking of the motor into the control circuit. These are not present in machines usually available. Therefore, in accordance with a particular embodiment of the invention the follow-up control is carried out by search run control 18; and the disappearing error signal in line 17 activates only the locking of the tape servo from M2 to its own reference pulses by means of the central program control 12 and the remote control 14.

The multiple switch 19 transmits one of the two counts of counters 5 or 6 to a comparator 21 and the multiple switch 20 transmits the constant value 16 to the comparator 21. When the cutting position is reached, that is, when there is conformity between the count of the counters and the constant value transmitter, the AND-gate 23 is activated through line 22 and the cutting machine M1 is switched to recording.

The subject invention as described may be modified in a simple manner in that the cutting end may be also preprogrammed, and that in the insert operation, that is, when the cutting end is defined by M1, as well as in the assemble operation, when the cutting end is defined by M2. For this purpose, the program control is positioned to "end of insert" by the schematically shown switch 24, after the cutting start had been defined as described above. During the insert operation the multiple switch 26 switches the output of counter 5 to the storage device 27, the machine M1 is moved in a search run to the desired cutting end and the corresponding count of counter 5 is transmitted through line 28 to the storage device 27 by a control signal. In the assemble operation the cutting end is searched on machine M2 and the corresponding count of counter 6 is transmitted from the multiple switch 26 and the line 28 to the storage device 27.

When the cutting signal is given the procedure follows as described above. Both machines run in reverse direction beyond the cutting start for about 5 to 6 seconds. Thereafter, they return and M2 locks into the circuit by means of the comparator 11 and line 17. When conformity is obtained between the count of the counters and the constant value of 16, machine M1 starts the recording through line 22. At the same time multiple switch 20 is actuated and the conformity between the counter value and the storage value 27 is again identified in comparator 21, so that the recording of machine M1 is terminated by means of line 22 and the AND-gate 29.

I claim:

1. A system for electronic tape editing with magnetic tape recording and play-back machines for video signals, whereby program portions are recorded from a feeding machine to a cutting machine in arbitrarily chosen sequence and length, the machines are movable in forward and reverse motion by means of tape feeding shafts and servo controls containing tacho generator pulses for driving the feeding shafts, the count of said tacho generator pulses from an arbitrary editing start serving as information of the actual tape position in both machines and in both running directions.

2. A system in accordance with claim 1, in which the tacho-pulses of the tape feeding shafts of both said cutting and feeding machines are counted in first and second counters, respectively, each of said counters being a forward and reverse counter and both of said counters for each predetermined cutting start being placed on the same fixed value by means of a central program control.

3. A system in accordance with claim 2, in which the counting results of said counters are transmitted in binary coded form and compared with each other in a first comparator, and said feeding machine is subjected to a follow up control to the tape position of said cutting machine by means of said first comparator.

4. A system in accordance with claim 3, in which the follow up control of said feeding machine is carried out by its search-run control.

5. A system in accordance with claim 2, in which a constant value transmitter is provided, the binary coded output of which is in conformity with the set position of said first and second counters for the cutting start and is compared with one of the counts in a second comparator, whereby said second comparator delivers an output signal which delivers the cutting start signal to said cutting machine when the compared values are in conformity with each other.

6. A system in accordance with claim 2 in which the count from the beginning of an edit operation to an arbitrarily predetermined end can be transmitted from each of said two counters into a storage device.

7. A system in accordance with claims 5 or 6 in which one input of said second comparator is switchable from said constant value transmitter to said storage device simultaneous with the cutting signal.

* * * * *